Jan. 8, 1929.

R. M. CRAIG 1,698,223

DISPLAY APPARATUS

Original Filed Dec. 29, 1925    3 Sheets-Sheet 1

Inventor
R. M. Craig.

By Lacy & Lacy, Attorneys

Jan. 8, 1929.

R. M. CRAIG 1,698,223

DISPLAY APPARATUS

Original Filed Dec. 29, 1925    3 Sheets-Sheet 3

Inventor
R. M. Craig.

By Lacey & Lacey, Attorneys

Patented Jan. 8, 1929.

1,698,223

UNITED STATES PATENT OFFICE.

RICHARD MORGAN CRAIG, OF SAN ANTONIO, TEXAS.

DISPLAY APPARATUS.

Application filed December 29, 1925, Serial No. 78,248. Renewed May 4, 1928.

This invention relates to a novel method of and apparatus for producing the effect of apparent continuous motion or continuous change in appearance of subject matter to be displayed for advertising, amusement, educational and other purposes.

In applications filed August 14, 1925, Ser. No. 50,330, and December 29, 1925, Ser. No. 78,246, respectively, I have disclosed methods of and apparatus for producing the effect of apparent motion or change in appearance or position of a represented object, but in such cases, the display has been limited to two changes or, at most, three. The present invention, however, has as its general object to provide for the display of subject matter such as advertising matter or the like in such a manner that a represented animate figure will apparently move continuously or continuously change in appearance or position, so that effects may be produced entirely different from those produced by the methods of my said co-pending applications.

Where the principles of the invention are employed for advertising displays, the matter to be displayed is represented upon a display surface and, through proper illumination of said surface, the effect of animation is produced, the matters to be displayed being represented in pigment colors upon said surface and the surface being flooded with light rays having different color characteristics in a manner to produce the effect stated, and, therefore, the present invention has as an object, to provide a novel arrangement of the figure representations upon the display surface and a novel means for successively displaying said figures in such a manner that, due to persistence of vision, the effect of continuous motion will be produced.

Another object of the invention is to provide a method of and apparatus for not only producing the effect of apparent continuous motion or continuous change in appearance of the subject matter to be displayed, but also displaying the subject matter under pleasing colored lighting conditions, so that, as an advertising medium, the surface to be displayed attracts immediate attention because of the presence of the factors of colored light illumination and animation.

In the drawings, and in the description which is to follow, the invention has been illustrated and will be described as applied to advertising displays, but the principles of the invention are by no means limited to this particular use as they may find embodiment in displays of various characters, and, therefore, what is illustrated and described is to be considered merely as representative of concrete embodiments of the inventive idea and not as restricting the invention to the specific disclosure.

In the description, reference will be made to "display surface" and this term is intended to cover any surface of any character whatsoever upon which there is represented matter to be displayed and regardless of the character of the said matter. Where reference is made to light rays having "different color characteristics" the term is intended to indicate that the light rays are not identically the same but possess such spectral or color difference between themselves as to suit the purposes of the invention. I will also refer to "spectral colors" and such reference applies to colors of the spectrum as represented by colored light rays. Reference will also be made to "neutral colors" which colors are employed, in the form of pigments, as backgrounds, and by neutral colors is meant such colors as do not materially change under the light rays by which the display surface is illuminated or, in other words, those colors which display no decided color characteristics such as are peculiar to primary colors, and which remain of about the same apparent density under complementary or primary colored light ray illumination.

Figure 1:
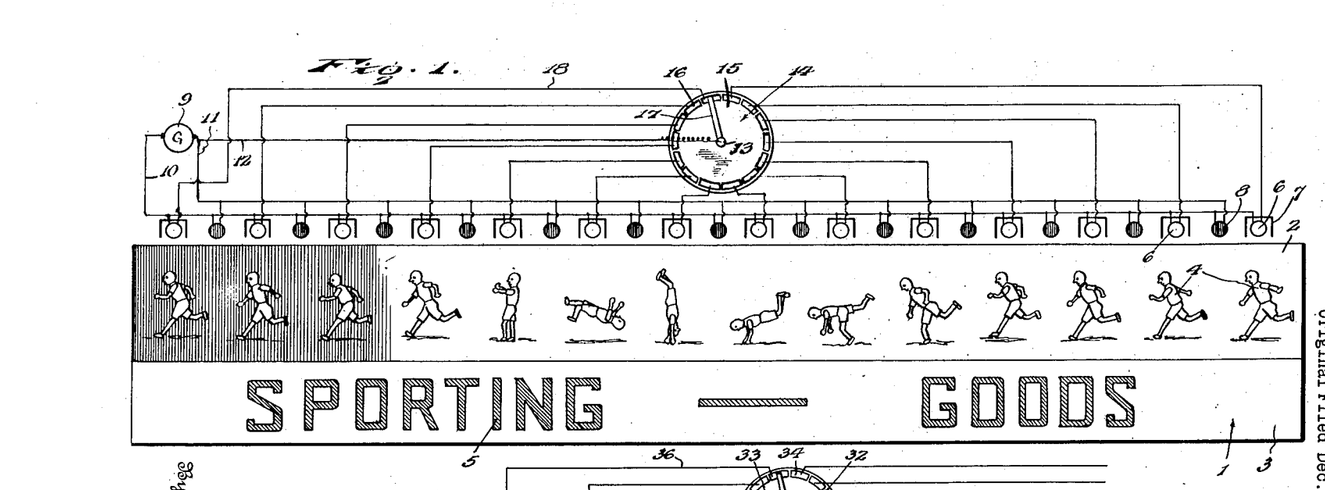
Figure 1 is a schematic view illustrating one application of the principles of the invention to a display surface.

In the embodiment of the invention illustrated in Figure 1 of the drawings, the principles of the invention are exemplified as applied to an advertising sign constituting a display surface indicated in general by the numeral 1, and which may be a signboard or any other surface suitable or available for the purpose. Pigments are applied to the surface 1 to provide two background areas, one indicated by the numeral 2 and the other by the numeral 3, and these areas extend longitudinally transversely of the display surface and are vertically displaced with relation to each other, as clearly shown in the said figure. The background area 3, in this embodiment of the invention, is of a light neutral color such for example as white lead, zinc white, gray, slate, sand, etc., whereas the background area 2 is represented in red or some other distinctive color. Upon the background area 2 there is painted or otherwise represented by white pigment, a row of images 4 extending longitudinally throughout the length of the said area 2 and, in the present instance, representing a person running from the right hand end of the display surface toward the left hand end thereof, each successive image, in the order stated, assuming a different posture and the image representations near the central portion of the display surface being of such character as to represent the various postures which would be assumed by a runner turning a "flip-flop" and then landing on his feet, the image representations at the left hand side of the background area representing the runner continuing his running course in various running postures. It is the purpose of the invention, as exemplified in Figure 1, to display to the eye the representation of an athlete or other person running across the display surface from right to left, running a part of the distance across said surface, then turning a "flip-flop" and landing on his feet, and then running, apparently, off of the display surface at the left hand end thereof, and at this point it will be understood that the background area 2 may have displayed thereon a greater or less number of images than is illustrated in the figure being described, and that various other motions of animate or inanimate things or objects may be portrayed. It will likewise be noted at this point that the images, being painted in white, contrast with the red or other background of distinctive color so that, in daylight, all of the images will be visible to the eye. The manner of portraying the effect of continuous motion or animation will presently be explained.

Upon the background area 3 there may be painted or otherwise depicted in any suitable pigment or pigments, any desired advertising matter, indicated in general by the numeral 5 and this matter will be represented in a pigment of a distinctive color such for example as green, and contrasting with the pigment color in which the background area 2 is represented. As stated, the background area 3 is represented in a light neutral color and examples of such colors are given above and the said area may, for example, be white, inasmuch as white is a neutral color.

It will be observed by reference to Figure 1 of the drawings, that the images 4 are substantially equi-distantly spaced throughout the length of the background area 2, and arranged at the upper side of the display surface are a plurality of white light ray sources such for example as clear or white electric light bulbs indicated by the numeral 6, each of these bulbs being arranged above a respective one of the images 4. Each of the bulbs 6 is preferably shielded as indicated by the numeral 7, by any suitable reflecting means, so that when the bulb is lighted, the light rays therefrom will be thrown directly upon the portion of the background area 2 occupied by the respective image representation 4. Light bulbs 8 are also arranged above the display surface and are located each intermediate two adjacent ones of the bulbs 6, and these light bulbs, or other light rays sources, are of a color corresponding substantially to the color in which the background area 2 is represented, being, in the present instance, red in color. The numeral 9 indicates a source of current supply from one side of which leads a wire 10 connected to one terminal of the sockets for all of the light bulbs 6 and 8. Another conductor wire 11 leads from the other side of the source of current supply to the other terminal of each socket for each of the red light bulbs 8, and another conductor wire 12 likewise leads from this side of the source of current supply to the shaft 13 of an automatic flasher which is indicated in general by the numeral 14. There are many automatic flashers of different types which may be employed but, as a simple illustration, the numeral 15 indicates a disc of insulating material with respect to which the shaft 13 is rotatable, a number of contacts 16 being supported upon the face of the disc, and a contact arm 17 being fixed upon the shaft to successively engage the contact 16 as the shaft is rotated. Conductor wires 18 are led from the contacts 16 to the other terminals of individual ones of the sockets of the white light bulbs 6.

It will now be evident that all of the red light bulbs are constantly lighted, when the flasher is in operation during night hours, and inasmuch as the image representations 4 are in white upon a red background, they will not be visible under the red light display. However, as the contact arm 17 is rotated, the circuit is closed through the white light bulbs 6, successively from right to left throughout the series, so that the images 4 and the background areas upon which they are depicted will be successively flooded with white light. Therefore, the image representations will be successively displayed to view and, by properly timing the flasher mechanism so as to display these representations at a frequency of approximately sixteen per second, and due to the persistence of vision, the effect will be that of a man running across the board, turning a "flip-flop", and then running off the left hand end of the board. It will be understood that the contacts 16 may be varied as regards their length, so that, for example, when the man has landed upon his feet after turning the "flip-flop", he may momentarily remain stationary, and then again start to run, this being accomplished, of course, by forming the contact for the white light bulb which is associated with this particular image representation, somewhat longer than the other contacts. In fact, by selective proportioning of the contacts, various amusing and grotesque effects may be produced. It will be evident that by shielding the white light bulbs 6, the rays from each bulb are confined substantially to the portion of the background area 2 which bears the figure representation with which that particular bulb is associated, so that all of the other figure representations will be invisible at the time the one referred to is rendered visible.

Inasmuch as the display matter 5 is represented in green or blue-green, and is, therefore, of a color in contrast to the color of the bulbs 8, the red light rays will be absorbed by the colored pigment in which the said matter 5 is represented, and this matter will appear substantially black against the light neutral background 3 and will, of course, be constantly displayed to view. It will be understood, of course, that the background 2 may be green in color or, in fact, of any other distinctive pigment color, and the matter 5 may be represented in red or any other distinctive pigment color in contrast to the color of the background 2, the color of the light ray sources 8 being varied to correspond to the color of the background area 2.

Figure 2:
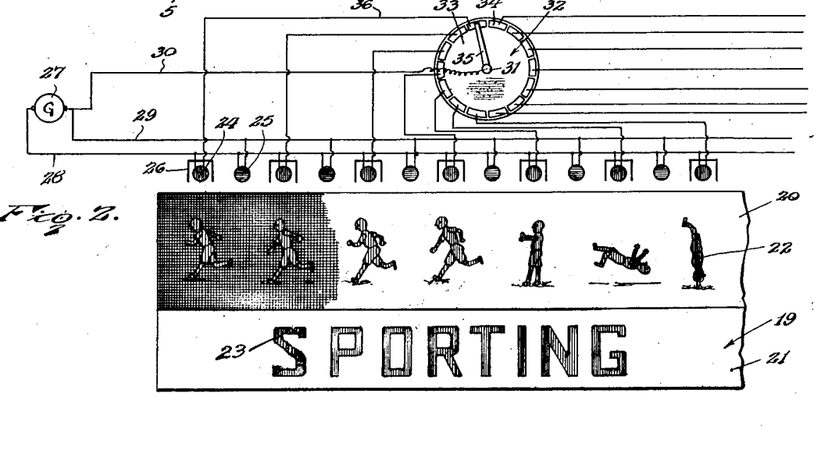
Figure 2 is a similar view illustrating another application of the principles of the invention to such a surface wherein a background different from that shown in Figure 1 is employed and wherein the matters to be displayed are all represented in a single distinctive pigment color.

Figure 2 of the drawings represents an embodiment of the principles of the invention in which the background areas are of contrasting neutral colors and in this figure the display surface is indicated in general by the numeral 19 and has applied thereto suitable pigments of neutral colors to provide background areas indicated one by the numeral 20 and the other by the numeral 21, and corresponding to the areas 2 and 3 in the previously described embodiment of the invention. In this instance, the background area 20 may be black or of any other dark neutral color as for example, dark gray, tobacco brown or Indian red, and the background area 21 is white in color or of any other light neutral color. In this embodiment of the invention, it will be noted that the background areas 20 and 21 are of contrasting neutral colors whereas the background area 2 in the previously described embodiment is of a distinctive pigment color and the background area 3 is of a neutral color. The difference in effects which are obtainable by this change in selection of background areas will be made apparent as the description proceeds. In Figure 2, image representations 22 corresponding to those indicated by the numeral 4 in Figure 1, are painted or otherwise represented in red pigment within the background area 20, and display matter, such for example as worded advertising matter, indicated by the numeral 23 and corresponding to the matter 5 in Figure 1, is represented in red pigment upon the background area 21. A series of sources of red light illumination such for example as electric light bulbs of a red color, indicated by the numeral 24, are arranged above the display surface, each above a respective one of the image representations 22, and blue light bulbs 25 are arranged alternately with the red light bulbs and, therefore, occupy positions above the spaces between relatively adjacent ones of the image representations 22, the red light bulbs 24 being preferably shielded by suitable shielding reflectors as indicated by the numeral 26.

The numeral 27 indicates in general a source of current supply from one side of which there is led a conductor wire 28 connected to one terminal of each of the sockets for the red light bulbs 24 and blue light bulbs 25, and from the other side of which there is led a conductor wire 29 connected to the other terminals of the sockets for all of the blue light bulbs 25. A conductor wire 30 is likewise led from the last mentioned side of the source of current supply to the shaft 31 of an automatic flasher indicated by the numeral 32, which, as in the previously described embodiment of the invention may be of any of the well known types suitable for the purpose. The numeral 33 indicates a flasher disc which is of insulating material, in this instance, and is mounted concentric to the shaft 31 and carries upon its face a plurality of contacts 34 to be successively engaged by a contact arm 35 fixed upon the shaft 31, conductor wires 36 being led from the contacts 34 to the other terminals of the sockets for respective one of the red light bulbs 24.

It will now be observed by reference to Figure 2, that, when the display apparatus is in operation, all of the blue light bulbs 25 will be simultaneously and continuously lighted or energized so that the entire display surface is flooded with blue light rays. Therefore, the image representations 22 which are in red will be obliterated inasmuch as they are upon a dark neutral background and likewise inasmuch as the spectral rays under which the images are displayed are of a color complementary to the color in which the images are represented, and, on the other hand, the matter 23 which is depicted in red pigment will stand out substantially black against the white or light neutral background area 21. However, as the flasher 32 is operated, the red light bulbs 24 will be successively lighted in order extending from the right hand end of the display surface to the left hand end thereof and, therefore, the image representations 22 will be successively brought to view individually, the images appearing, through contrast with the dark background area 20, substantially a vivid white and possessing marked brilliancy, due to such contrast. As previously pointed out, in this embodiment of the invention, there is a contrast of background areas in neutral colors whereas in the previously described embodiment, one of the areas is represented in a distinctive pigment color and the other in a light neutral color. It will likewise be observed that in this latter embodiment, the images 22 as well as the matter 23 are both represented in the same pigment color or, in other words, pigment colors having no visible spectral difference, whereas in the first described embodiment, the image representations 4 are in one color and the matter 5 is in another color.

Figure 3:
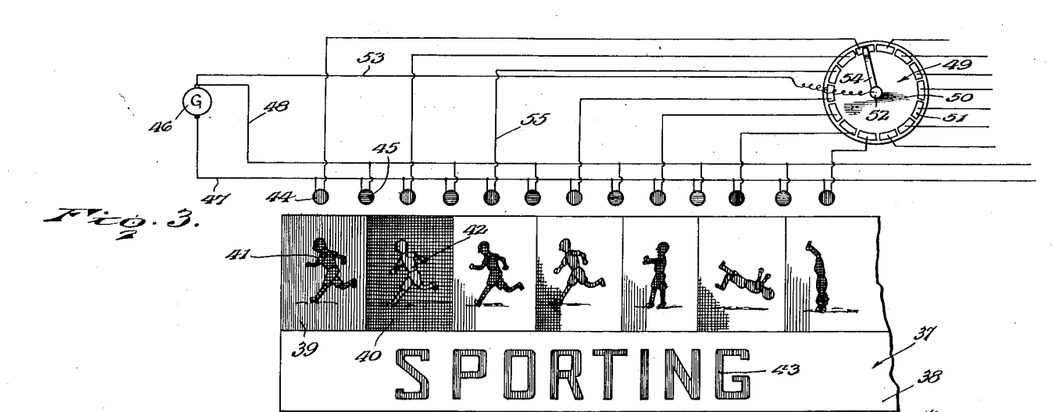
Figure 3 is a schematic view illustrating the applications of the principles of the invention embodying substantially a combination of the features shown in Figures 1 and 2 to produce a new and different effect.

Figure 3 of the drawings illustrates an embodiment in which the principles exemplified in both Figures 1 and 2 are, to an extent, combined. In said Figure 3, the display surface is indicated in general by the numeral 37 and a longitudinally extending area of the said surface has applied to it a light neutral pigment of any of the light neutral colors heretofore mentioned, so as to provide a light neutral background area indicated by the numeral 38. To certain other area portions of the display surface, pigment of a distinctive color, as for example red, is applied to provide background areas 39, and these areas are alternated with background areas 40 which are represented in a dark pigment color of a neutral character as for example black or brown. The areas 39 and 40 extend in a series longitudinally of the display surface and in a series offset vertically with relation to the background 38. Figure representations 41 are depicted upon the background areas 39 in a dark neutral color such for example as black, and image representations 42 are depicted upon the background areas 40 in a distinctive color such for example as red and which color corresponds to or does not possess any visible spectral difference from the color in which the background areas 39 are represented. The image representations 41 and 42 are alternately arranged throughout the entire series and the postures represented in successive ones of the image representations are such as to produce the effect of animation as in the first described embodiment of the invention. Upon the background area 38, which as previously stated, is of a light neutral color, there may be represented any suitable advertising or other matter indicated by the numeral 43 and in representing this matter, a pigment of a distinctive color, in this instance corresponding substantially to the color of the background areas 39, will be employed, namely red. The numeral 44 indicates a series of red light bulbs which are arranged each above a respective one of the background areas 39 and 40, so as to illuminate the same in a manner to be presently explained, and the numeral 45 indicates a number of blue light bulbs which are alternately arranged with respect to the red light bulbs 44 and are positioned substantially vertically above and in alinement with the line of division between the relatively adjacent ones of the background areas 39 and 40. The numeral 46 indicates a source of current supply to one side of which is connected a conductor wire 47 electrically connected with one terminal of the socket for each of the bulbs 44 and 45, and a conductor wire 48 is connected with the other side of the source of current supply and to the other terminal of each socket for each blue light bulb 45, so that the bulbs 45 will be continuously lighted during the operation of the display apparatus. The numeral 49 indicates in general an automatic flasher which may comprise a flasher disc 50 having an annular series of contact strips 51 upon its face, and the numeral 52 indicates a rotary shaft to which is connected a conductor wire 53 which leads from the last mentioned side of the source of current supply to the shaft supporting the contact arm 54 which, in the rotation of the shaft, is designed to successively sweep over the contact strips 51. Conductor wires 55 are connected to the contact strips 51 and led to and electrically connected with the other terminals of the sockets for respective ones of the red light bulbs 44. It will now be evident that inasmuch as the entire display surface is continuously illuminated by light rays from the blue light bulbs 45, all of the image representations 41 and 42 will, under such illumination, be invisible, due to the fact that the red background areas 39, under blue light illumination, will appear substantially black, and, as the image representations 41 are in black or any other suitable dark neutral color, there will be no contrast between the backgrounds and the image representations and, inasmuch as the image representations 42 are in red, they will appear substantially black under the blue light illumination and there will, therefore, be no contrast between said representations and the black backgrounds upon which they are depicted. However, as the flasher 49 is operated, the red lights 44 will be successively flashed on in order ranging from the right hand end of the board to the lefthand end thereof and, therefore, the image representations 41 and 42 will be successively illuminated and displayed to the vision of the observer. As each background area 39 is flooded with red light rays, the image representation 41 which is in black or some other dark neutral color, will appear substantially black against an apparently white background, and as each background area 40 is flooded with red light rays the image representation 42 thereon, being represented in red pigment, will appear substantially white against a black background. Therefore, in this embodiment of the invention, the image will apparently successively appear black and then white as the various movements are portrayed. Inasmuch as the display surface in its entirety is continuously flooded with blue light rays, the matter 43, being in red, will appear substantially black against a white background and will be continuously displayed to view. It will be understood that instead of employing red as a distinctive pigment color in which to portray the image representations 42 and the background areas 39, as well as the matter 43, any other distinctive pigment color may be employed such for example as green, in which event green light bulbs would be substituted for the red light bulbs 44, and red light bulbs would be substituted for the blue light bulbs 45. In fact, there are many possible selections of pigment and spectral colors which may be employed in carrying out the invention as exemplified in Figure 3.

Figure 4:
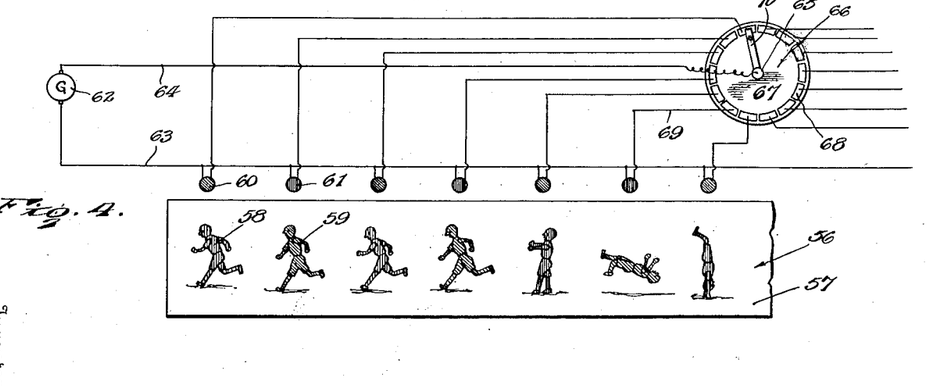
Figure 4 is a schematic view illustrating still another application of the principles of the invention and exemplifying the use of contrasting pigment colors in the representation of the matters to be displayed.

Figure 4 of the drawings represents another application of the principles of the invention to a display surface for the purpose of representing the appearance of continuous motion, and in this figure, the display surface is indicated by the numeral 56 and has applied to it any suitable light neutral pigment to provide a light neutral background indicated by the numeral 57. Upon this background there are painted or otherwise represented, in contrasting pigment colors, image representations certain of which are indicated by the numeral 58 and are, for example, red in color, and other alternately arranged ones of which are indicated by the numeral 59 and are, for example, green in color. Arranged above each of the image representations 58 is a green or blue-green electric light bulb 60, and a red light bulb 61 is arranged above each of the image representations 59. The numeral 62 indicates a source of current supply, to one side of which is connected a conductor wire 63 which is electrically connected with one terminal of each of the sockets for the electric light bulbs 60 and 61. A conductor wire 64 leads from the other side of the source of current supply to the rotary shaft 65 of an automatic flasher indicated in general by the numeral 66, and which may comprise a flasher disc 67 of insulating material carrying an annular series of contact strips 68 which are individually connected by conductor wires 69 with the other terminals of the sockets for the red and green light bulbs. A contact arm 70 is carried by the shaft 65 and is adapted to successively engage the contact strips 68. In this embodiment of the invention, the green light bulbs 60 and red light bulbs 61 are successively alternately energized or lighted and consequently the image representations 58 which are in red and the image representations 59 which are in green, are successively alternately illuminated respectively by green and red light rays. Therefore, when each image representation 58 is flooded with green light, it will appear substantially black against the light background 57 and, when the image representation 59 which is in green is flooded with red light rays, it also will appear substantially black against a light background area. Therefore, the image representations will be successively presented to the vision of the observer and the effect of animation, as previously described, will be produced.

Figure 5:
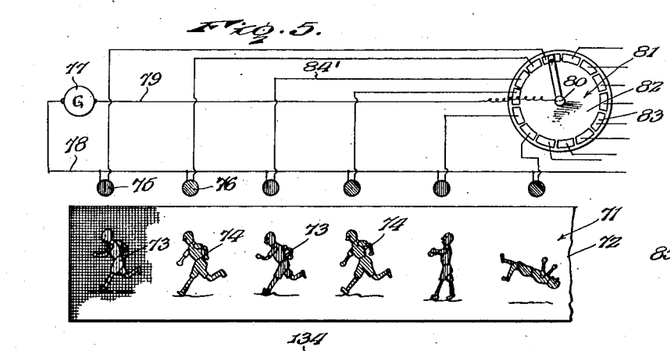
Figure 5 is a schematic view similar to Figure 4, but exemplifying in comparison to Figure 4, the different effects which may be produced through a proper selection of backgrounds for the figure representations.

It will be observed that in the embodiment of the invention just described, the image representations are depicted in contrasting colors, alternately throughout the series, upon a light neutral background and are displayed under spectral rays of contrasting colors. In the embodiment illustrated in Figure 5 of the drawings, a converse application of the principles of the invention is exemplified and in this figure, the display surface is indicated in general by the numeral 71 and has applied to it any suitable pigment of a dark neutral color as for example black, brown, Indian red, etc., so as to provide a dark neutral background indicated by the numeral 72. Upon this background image representations 73 and 74 are depicted by the use of pigments of contrasting distinctive colors such for example as red and green respectively, the representations being alternated as regards their color characteristics, throughout the entire series, as in the embodiments of the invention illustrated in Figures 3 and 4 of the drawings. Arranged above each of the representations 73 is a red electric light bulb indicated by the numeral 75, and a green light bulb 76 is arranged above each of the image representations 74. The numeral 77 indicates a source of current supply and a conductor wire 78 is led from one side of the said source of supply and electrically connected with one terminal of the socket for each of the bulbs 75 and 76. A conductor wire 79 is led from the other side of the source of current supply to the rotary shaft 80 of an automatic flasher of the type previously described and indicated in general by the numeral 81, the said flasher including a disc 82 of insulating material carrying upon its face an annular series of contact strips 83 certain of which are connected by conductor wires with the other terminals of the sockets for the red light bulbs 75 and others by other conductor wires with the other terminals of the sockets for the green light bulbs 76, these conductor wires being indicated by the numeral 84' and the said contact strips 83 being alternately arranged as regards their electrical connection with the sockets for the red and green light bulbs. In the operation of this display apparatus, the light bulbs 75 and 76 are successively alternately energized so that the image representations 73 and 74 are alternately successively respectively flooded by red light rays and green light rays. It will be evident that when each image representation 73 is flooded with red light rays, this representation, being of a red pigment color, will stand out substantially white against a black background and, likewise, when each image representation 74 is flooded with green light rays, it, being in green, will stand out white against a substantially black background. Therefore, the image representations are successively displayed in white against a substantially black background and the effect of animation is obtained as in the previously described embodiments of the invention. By a comparison of the backgrounds and the colors in which the image representations are depicted in Figures 4 and 5, it will be observed that whereas in the former instance the images appear black against a white background, in the latter instance they appear white against a black background. It will be understood, of course, that colors other than red and green may be employed in depicting the image representations in the form of the invention shown in Figure 5, and that the light ray sources 75 and 76 may be correspondingly modified so as to obtain precisely the same results as by the selection of pigments and spectral colors disclosed in said figure.

Figure 6:
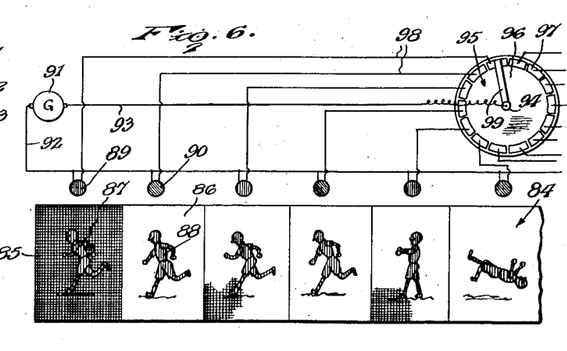
Figure 6 is a schematic view illustrating still another application of the principles of the invention and exemplifying the use of contrasting background areas and the representation of the figures or other matters to be displayed in a single distinctive pigment color.

Figure 6 of the drawings illustrates still another application of the principles of the invention in which approximately the same effects are obtained as in the embodiment shown in Figure 3, except that there is a difference in the selection of the background areas. In Figure 6, the display surface is indicated in general by the numeral 84 and its area is divided into background areas indicated by the numerals 85 and 86. The background areas 85 are of a dark neutral color such for example as black, and the background areas 86 are of a light neutral color such for example as white, so that in this case, there is a color contrast between the background areas but the said areas are displayed in contrasting neutral colors. Image representations 87 and 88 are depicted upon the background areas 85 and 86 respectively, and these representations are in some suitable distinctive pigment color such for example as red. The image representations 87 and 88 are alternated and correspond in character substantially to the image representations of the previously described forms of the invention. Arranged above each image representation 87 and its respective background 85, is a red light bulb 89, and a green light bulb 90 or a bulb of any other color contrasting with red, is arranged above each image representation 88 and its corresponding background 86. The numeral 91 indicates a source of current supply to one side of which is connected a conductor wire 92 leading to and electrically connected with one terminal of the socket for each of the light bulbs 89 and 90. Another conductor wire 93 is led from the other side of the source of current supply to the rotary shaft 94 of an automatic flasher which corresponds to the flasher previously described and is indicated in general by the numeral 95. The flasher, as in the previously described embodiment, includes a disc 96 of insulating material upon the face of which are arranged a number of contact strips 97, and conductor wires 98 are led from the said strips to the other terminals of the sockets for the light bulbs 89 and 90, the arrangement being such that in the rotation of the flasher shaft 94 and the contact arm 99 carried thereby, current will be supplied successively to the bulbs 89 and 90 throughout the series thereof so as to successively alternately flood the display areas 85 and 86 respectively with red and blue or green light rays. When each background area 85 is flooded with red light rays the image representation 87 thereon will stand out apparently in brilliant white against a black background and when each background area 86 is flooded with green or blue light rays, the image representation 88 will stand out substantially black against a light background. Therefore, the effect of animation or continuous motion is obtained as in the previously described embodiments, and the images are caused to appear alternately in white and black.

Figure 7:
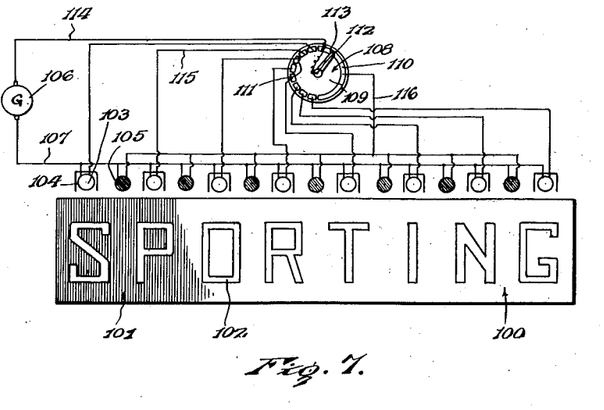
Figure 7 is a schematic view illustrating the application of the principles of the invention to the display of worded advertising matter.

In the preceding description, the principles of the invention as adapted to the display of matter representing the effect of animation, have been exemplified. In Figure 7 of the drawings, there is disclosed an arrangement whereby the principles of the invention may be employed in producing a different effect, namely, the spelling out of worded advertising or other matter, letter by letter, or word by word and then the coincident display of all of the component parts of the advertising or other matter, thus attracting and holding the attention of the observer and impressing the substance of the displayed matter upon his mind. In this figure, the display surface is indicated by the numeral 100 and a pigment of a distinctive color such for example as red, is applied to the surface so as to provide a background 101 represented in such color. The advertising or other matter to be displayed, as for example the word "Sporting" is depicted upon the background area in white, as indicated by the numeral 102, the word extending longitudinally across the display surface. A number of white light bulbs 103 are arranged along the upper side of the display surface, each above a respective one of the letters of the word, and these light bulbs are preferably shielded, as indicated by the numeral 104, so that when energized the rays from the bulbs will be directed onto that portion only of the background area upon which the associated or respective letter, word or other portion of advertising matter is represented. Green light bulbs 105 are alternated with the white light bulbs 103. The numeral 106 indicates a source of current supply, and a conductor wire 107 is led from this source of supply at one side, and connected electrically to the terminals of all of the sockets for the light bulbs 103 and 105. The numeral 108 indicates an automatic flasher of the general type heretofore described and comprising a disc 109 of insulating material having a relatively long arcuate contact strip 110 upon its face and an arcuate series of shorter contact strips 111 likewise positioned upon its face. The shaft of the flasher is indicated by the numeral 112 and supports an arm 113 designed, in the rotation of the shaft, to sweep over the contact strips 110 and 111. A conductor wire 114 is connected to the other side of the source of current supply and to the shaft 112, and conductor wires 115 are led from the contact strips 111 to the other terminals of the sockets for the white light bulbs 103. A conductor wire 116 is led from the contact strip 110 and electrically connected by suitable branches with the other terminals of the sockets for the green light bulbs 105. In the operation of the flasher 108, the white light bulbs 103 are successively flashed so as to successively illuminate the portions of the background area which bear the individual letters comprising the word to be displayed, so that these letters, as for example in the word "Sporting", are successively momentarily presented to the view of the observer. As the contact arm 113 sweeps over the contact strip 110, all of the green light bulbs will be simultaneously lighted and, therefore, the entire word will stand out substantially white in color against a black background. Therefore, the word is first spelled and then displayed in its entirety. The example given of this adaptation of the principles of the invention is, of course, an extremely simple one and it will be understood that much more complex arrangements may be provided, depending upon the character of the advertising or other matter which is to be displayed.

Figure 8:
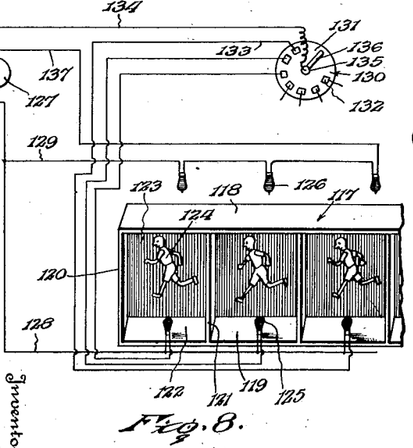
Figure 8 is a schematic perspective view illustrating a further application of the principles of the invention.

Figure 8 of the drawings represents an embodiment of the invention somewhat different from the embodiments previously described, and in this figure the numeral 117 indicates in general a box or casing having top and bottom walls 118 and 119 respectively, end walls 120, and a number of partition walls 121 which divide the interior of the box into a number of compartments indicated by the numeral 122. Within the front of the box there is arranged a semi-transparent or translucent light ray transmitting pane, sheet or other medium, indicated by the numeral 123 which, in the present instance, is red in color, and within the bounds of the compartment across which the sheet or pane extends, there is represented upon said sheet or pane, an image 124 which may correspond to the images shown in Figures 1 to 6 inclusive, and which image is transparent. Blue light bulbs 125 are arranged one within each of the compartments 122, and other blue light bulbs 126 are arranged above and preferably slightly in front of the box 117. The numeral 127 indicates a source of current supply, and the numeral 128 indicates a conductor wire which is led from one side of the source of current supply and is electrically connected with one terminal of each of the sockets for the blue light bulbs 125. A conductor wire 129 is likewise led from this side of the source of current supply to the terminals of the sockets for the blue light bulbs 126. The numeral 130 indicates in general an automatic flasher similar to the flashers heretofore described and comprising a disc 131 carrying a number of contact strips 132 from each of which there leads a conductor wire 133 electrically connected with the other terminal of the socket for the respective one of the blue light bulbs 125. Another conductor wire 134 leads from the other source of current supply to the shaft 135 of the flasher, so that when the contact arm 136 of the flasher is rotated and sweeps over the contact strips 132 successively, the light bulbs 125 will be successively energized and, therefore, the interior of the compartments 122 will be successively illuminated by blue light rays. A conductor wire 137 is likewise led from the said other side of the source of current supply to the other terminals of the sockets for the blue light bulbs 126, and it will be understood that the said bulbs 126 are constantly lighted during the operation of the flasher so that, generally speaking, the display surface comprising the light ray transmitting medium 123 will appear substantially opaque. However, as each blue light bulb 125 is successively lighted, the corresponding compartment will be interiorly flooded with blue light rays and, therefore, the image representations 124 will be successively made visible by transmitted blue light rays.

Having thus described the invention, what I claim is:

1. Means for displaying the effect of continuous motion comprising a display surface having a background of a distinctive color, said surface bearing a series of representations of an image representing different positions of movement thereof, the image representations being of a light color in contrast with the background, means for displaying the whole of said surface under light rays of a spectral color corresponding substantially to the background color, and means for displaying said image representations successively and individually under white light rays.

2. Means for displaying the effect of continuous motion comprising a display surface having a background area of a distinctive color, the said surface having another background area of a color in contrast with the first mentioned color, the said surface bearing within the bounds of its first mentioned area, a series of representations of an image representing different positions of movement thereof, the image representations being of a light color to contrast with the background, the said display surface bearing within the bounds of its second mentioned area other matters to be displayed represented in a distinctive pigment color in contrast with the color of the first mentioned background area, means for displaying the whole of said surface under light rays of a spectral color corresponding substantially to the background color first mentioned and in contrast with the color in which the last mentioned matter is represented, and means for displaying said image representations successively and individually under white light rays.

3. Means for displaying the effect of continuous motion of a subject in the performance of a cycle of motions of which the subject is capable, the said means comprising an unobstructed display surface bearing a linear series of representations of the subject in different positions of movement thereof necessary to complete the cycle, the representations being spaced from and independent of one another throughout the series, and means for illuminating the representations successively and individually throughout the series.

In testimony whereof I affix my signature.

RICHARD M. CRAIG. [L. S.]